US011023660B2

(12) United States Patent
Roh et al.

(10) Patent No.: US 11,023,660 B2
(45) Date of Patent: Jun. 1, 2021

(54) TERMINAL DEVICE FOR DATA SHARING SERVICE USING INSTANT MESSENGER

(71) Applicant: SK PLANET CO., LTD., Seongnam-si (KR)

(72) Inventors: Hai Gang Roh, Seongnam-si (KR); Han Joon Kim, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 775 days.

(21) Appl. No.: 14/547,977

(22) Filed: Nov. 19, 2014

(65) Prior Publication Data

US 2015/0082155 A1 Mar. 19, 2015

Related U.S. Application Data

(63) Continuation of application No. PCT/KR2012/007989, filed on Oct. 2, 2012.

(30) Foreign Application Priority Data

Jun. 11, 2012 (KR) .................. 10-2012-0062313

(51) Int. Cl.
*G06F 40/166* (2020.01)
*G06F 16/34* (2019.01)
(Continued)

(52) U.S. Cl.
CPC .......... *G06F 40/166* (2020.01); *G06F 16/345* (2019.01); *G06Q 50/01* (2013.01);
(Continued)

(58) Field of Classification Search
CPC .... G06F 17/24; G06F 17/30719; G06Q 50/01
See application file for complete search history.

(56) References Cited

U.S. PATENT DOCUMENTS 7,979,880 B2 * 7/2011 Hosea .............. H04N 21/25891
709/219
8,407,217 B1 * 3/2013 Zhang ..................... G06F 17/28
707/708
(Continued)

FOREIGN PATENT DOCUMENTS

JP 2005301584 A 10/2005
JP 2007188225 A 7/2007
(Continued)

OTHER PUBLICATIONS

W3 ID Selectors, Dec. 31, 2011, W3.org, 1 page.*
(Continued)

*Primary Examiner* — Ariel Mercado
(74) *Attorney, Agent, or Firm* — Fenwick & West LLP

(57) ABSTRACT

The present invention relates to a data sharing service system, and a method and a device for a data sharing service, and to the data sharing service in a multi-device environment. Particularly, the present invention enables a user to summarize information on content being used or to transmit data on specific content to terminal device of another party by using a messenger, so that the user can gather the contents of interested articles (or books) to manage the contents by compiling statistics and the user can easily notify the other party of the contents of the articles (or books) without requiring the user to write out the interested contents one by one when using the messenger.

2 Claims, 5 Drawing Sheets

(51) Int. Cl.
*H04L 12/58* (2006.01)
*G06Q 50/00* (2012.01)
*H04W 4/21* (2018.01)

(52) U.S. Cl.
CPC ............ *H04L 51/00* (2013.01); *H04L 51/063* (2013.01); *H04W 4/21* (2018.02)

(56) References Cited

U.S. PATENT DOCUMENTS

| | | | |
|---|---|---|---|
| 8,799,401 B1* | 8/2014 | Bryar | G06F 17/30253 709/217 |
| 2006/0136821 A1* | 6/2006 | Barabe | G06F 40/166 715/205 |
| 2010/0159965 A1* | 6/2010 | Pascal | H04L 51/066 455/466 |
| 2012/0036151 A1* | 2/2012 | Jitkoff | G06F 3/167 707/769 |
| 2012/0047131 A1* | 2/2012 | Billawala | G06F 16/338 707/723 |
| 2013/0144870 A1* | 6/2013 | Gupta | G06F 16/951 707/726 |
| 2013/0191452 A1* | 7/2013 | Beerse | H04L 65/403 709/204 |
| 2014/0006012 A1* | 1/2014 | Zhou | G06F 16/3329 704/9 |
| 2014/0109009 A1* | 4/2014 | Xu | G06F 3/04842 715/810 |

FOREIGN PATENT DOCUMENTS

| | | |
|---|---|---|
| JP | 2009217802 A | 9/2009 |
| KR | 1020070070323 A | 7/2007 |
| KR | 1020090080689 A | 7/2009 |

OTHER PUBLICATIONS

CSS Grid Layout W3C Working Draft, Mar. 22, 2012, W3C, pp. 1-44 (Year: 2012).*
International Search Report dated Feb. 6, 2013 for PCT/KR2012/007989.

* cited by examiner

TERMINAL DEVICE FOR DATA SHARING SERVICE USING INSTANT MESSENGER

CROSS REFERENCE TO RELATED APPLICATION

This instant application is a continuation of PCT/KR2012/007989, filed Oct. 2, 2012, which is based on and claims priority of Korean Patent Application No. 10-2012-0062313, filed on Jun. 11, 2012. The disclosures of above-listed applications are hereby incorporated by reference herein in their entirety.

TECHNICAL FIELD

The present invention relates to a data sharing service in a multi-device environment, and more particularly, to a data sharing service system and a method and device for a data sharing service which are directed to summarize content being used by a user or transmit data of specific information to a counterpart terminal device using a messenger.

BACKGROUND

With the development of communication technology, work styles and communication infrastructure are rapidly being diversified in recent years.

Lately, technologies for communication and data sharing among various devices in a multimedia environment in which the various devices communicate with each other are under development.

As a technique for the purpose, a messenger may be used. A messenger refers to a program for exchanging messages and data in real time, and enables terminal devices, such as cellular phones, personal computers (PCs), personal digital assistants (PDAs), Internet telephones, smart phones, etc., to share data, such as photographs, moving pictures, etc., while communicating with each other.

SUMMARY

One aspect of the present invention provides a data sharing system including: a terminal device configured to, when an entire area or an area is selected by a user from content displayed on a screen, read only content data of the area selected from the displayed content, transmit content selection information including the read content data to a service device, receive content data obtained by editing the read data from the service device, and transmit the received content data to a counterpart terminal device through a messenger in use; and the service device configured to receive the content selection information from the terminal device, search the read content data included in the content selection information for specific information, filter content data corresponding to the found specific information, edit the filtered content data, transmit the edited content data to the terminal device, perform statistical processing on the edited content data according to fields of interest, and store and manage the edited content data according to the fields of interest.

In the data sharing system of the present invention, the terminal device may request content management data corresponding to information on a field of interest input by the user from the service device, receive the content management data obtained through the statistical processing and managed from the service device, and transmit the received content management data to the counterpart terminal device through the messenger in use.

Another aspect of the present invention provides a service device for a data sharing service including: a communication unit configured to communicate with a terminal device via a communication network; and a control unit configured to perform control so that an application for the data sharing service is provided to the terminal device through the communication unit, content selection information including content data of an area selected by a user from content displayed on the terminal device through the application is received, the content data of the selected area included in the received content selection information is searched for specific information, content data corresponding to the found specific information is filtered, the filtered content data is edited, the edited content data is transmitted to the terminal device, the edited content data is subjected to statistical processing, stored, and managed according to fields of interest.

In the service device for a data sharing service of the present invention, the control unit may include: a content analyzer configured to search the content data received from the terminal device for the specific information using at least one of a special mark and a previously set item, and filter the content data corresponding to the found specific information; a content editor configured to edit the content data filtered in the content analyzer by summarizing and combining the filtered content data, and transmit the edited content data to the terminal device; and a statistics processor configured to perform the statistical processing on the edited content data according to the fields of interest.

In the service device for a data sharing service of the present invention, the content editor may summarize the filtered content data using a word or a sentence marked with the special mark in the filtered content data, and include the summarized content data in a summary field.

In the service device for a data sharing service of the present invention, the content analyzer may check whether the received content data is content provided to the terminal device using content identification information received from the terminal device, read entire content data of the provided content, and filter the read entire content data using at least one of search information desired by the user, the special mark, and the previously set item.

In the service device for a data sharing service of the present invention, the content selection information may include at least one of the read content data, display form information, and user input information.

Still another aspect of the present invention provides a terminal device for a data sharing service including: a communication unit configured to communicate with a service device and a counterpart terminal device via a communication network; an output unit configured to display content in use on a screen; an input unit configured to, when an entire area or an area is selected by a user from content displayed on the screen of the output unit, generate an input signal for the selected area; and a control unit configured to perform control so that only content data of the selected area is read, the read content data is searched for specific information, content data corresponding to the found specific information is filtered, the filtered content data is edited, and the edited content data is transmitted to the counterpart terminal device through a messenger in use.

In the terminal device for a data sharing service of the present invention, the control unit may include: a content selector configured to, when the entire area or the area is selected from the content displayed on the screen, read only the content data of the selected area from a stored content file on the content; a content analyzer configured to search the content data of the selected area for the specific information using at least one of search information input by the user, a special mark and a previously set item, and filter the content data corresponding to the found specific information; a content editor configured to edit the content data filtered in the content analyzer by summarizing and combining the filtered content data; and a messenger processor configured to transmit the content data edited in the content editor to the counterpart terminal device using the messenger.

In the terminal device for a data sharing service of the present invention, the content selector may check an identification number of the area selected in the screen and read the content data mapped to the checked identification number.

In the terminal device for a data sharing service of the present invention, the content selector may configure a file access menu in the screen, and access the content file and read the content data desired by the user when the user selects the configured file access menu.

Yet another aspect of the present invention provides a method for a data sharing service in a service device of a data sharing service system including: providing an application for the data sharing service to a terminal device; receiving content selection information including content data of an area selected from content being used in the terminal device through an application; searching the content data included in the received content selection information for specific information using at least one of a special mark and a previously set item, filtering content data corresponding to the found specific information, and analyzing the content data; editing the filtered content data by summarizing and combining the filtered content data; and transmitting the edited content data to the terminal device. The edited content data is transmitted to a counterpart terminal device through a messenger being used in the terminal device.

Yet another aspect of the present invention provides a method for a data sharing service in a terminal device of a data sharing service system including: executing a messenger with a counterpart terminal device; when an entire area or an area is selected by a user from content displayed on a screen, reading content data of the selected area; searching the read content data for specific information using at least one of search information input by the user, a special mark and a previously set item, filtering content data corresponding to the found specific information, and analyzing the read content data; editing the filtered content data by summarizing and combining the filtered content data; and transmitting the edited content data to the counterpart terminal device using the messenger.

In a computer-readable recording medium of the present invention, a program for performing a method for a data sharing service is recorded.

DETAILED DESCRIPTION

Figure 1:
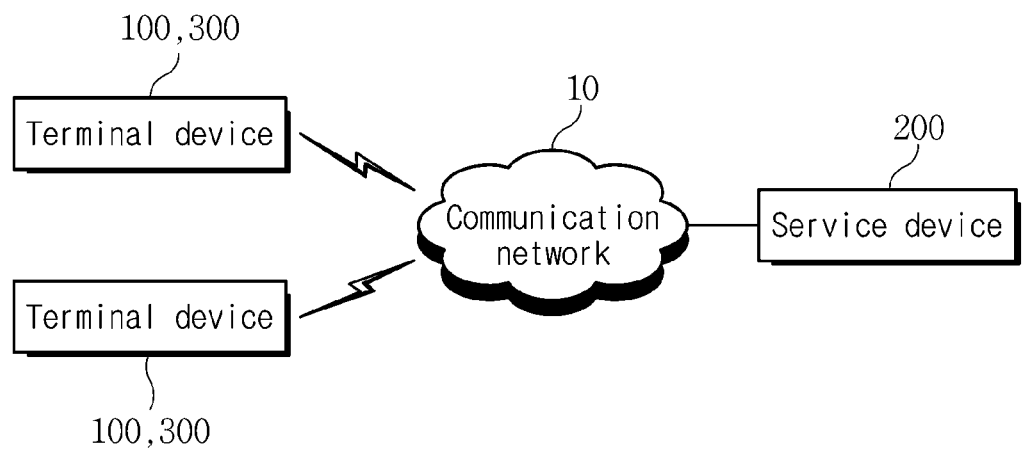
FIG. 1 is a diagram showing a data sharing service system in a multi-device environment according to exemplary embodiments of the present invention.

Hereinafter, exemplary embodiments of the present invention will be described in detail with reference to the accompanying drawings. However, in the following description and the accompanying drawings, detailed descriptions on well-known functions or structures which may obscure the gist of the present invention will be omitted. Also, it should be understood that throughout the drawings, like reference numerals denote like elements.

The terminology or words used in this specification and the claims described below should not be interpreted as typical meanings or lexical meanings, and they should be interpreted as the meaning and concept conforming to the technological spirit of the present invention according to the principle that the inventor can define the concept of the words appropriately in order to illustrate his or her invention in the best manner. Therefore, embodiments disclosed herein and constitutions illustrated in drawings are merely preferable embodiments of the present invention, and do not represent all the technological spirit of the present invention. Accordingly, it should be appreciated that there may be various equivalents and modifications for substituting those at the time point of filing this application.

With reference to the accompanying drawings, a data sharing service system in a multi-device environment according to an exemplary embodiment of the present invention will be described in detail.

FIG. 1 is a diagram showing a data sharing service system in a multi-device environment according to exemplary embodiments of the present invention.

Referring to FIG. 1, a data sharing service system according to exemplary embodiments of the present invention may include a plurality of terminal devices 100 and 300 which operate in conjunction with each other via a communication network 10, and a service device 200, and include other devices used for a data sharing service in addition to them.

The terminal devices 100 and 300 denote terminals capable of transmitting and receiving various types of data via the communication network 10 according to key manipulation of a user, and may be any one of a tablet personal computer (PC), a laptop, a PC, a smart phone, a personal digital assistant (PDA), a mobile communication terminal, and so on.

Also, the terminal devices 100 and 300 are terminals which perform voice or data communication using the communication network 10, and denote terminals having memories which store a browser, a program, and a protocol for communicating with the service device 200 via the communication network 10, microprocessors for executing various programs for calculation and control, and so on. In other words, the terminal devices 100 and 300 can be any terminals capable of performing server-client communication with the service device 200, and have a broad concept including all computing and communicating devices, such as a laptop, a mobile communication terminal, a PDA, and so on.

Meanwhile, the terminal devices 100 and 300 may be manufactured in a form having a touch screen, but are not limited to this form.

While content is used, the terminal devices 100 and 300 may operate in conjunction with the service device 200 via the communication network 10 to copy specific information or the content of a desired part in the content or summarize the entire content and transmit the copied content or the summarized content to the service device 200 through a messenger.

In particular, when a user selects an entire area or an area from content in use, that is, content displayed on a screen, through a downloaded application, the terminal device 100 or 300 according to exemplary embodiments of the present invention transmits content data obtained by editing content data of the selected area to the counterpart terminal device 100 or 300 through the messenger to share the content data with the counterpart terminal device 100 or 300. The detailed constitution of such a terminal device will be described later.

The service device 200 operates in conjunction with the terminal device 100 via the communication network 10, transmits the application to the terminal device 100, analyzes content data of an area selected in the terminal device 100, edits the analyzed content data, and transmits the edited content data to the terminal device 100. The detailed constitution of the service device 200 will be described later.

Devices for a data sharing service in the data sharing service system constituted as described above will be described in detail with reference to accompanying drawings. First, a constitution of a terminal device for providing a data sharing service according to an exemplary embodiment of the present invention will be described below.

Figure 2:
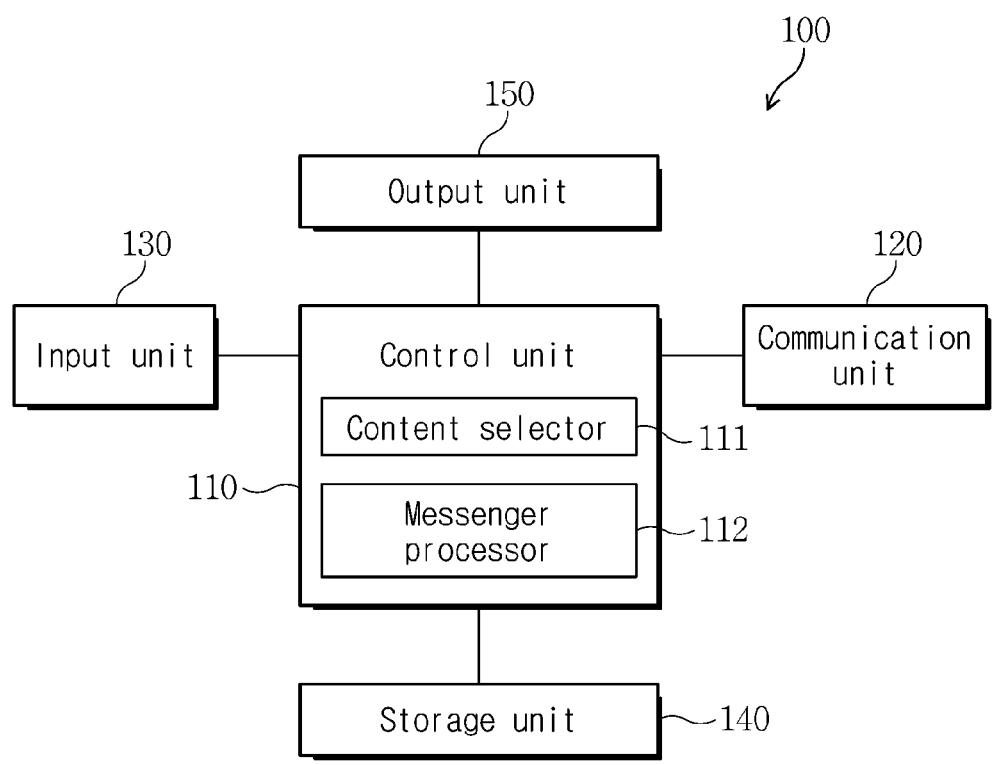
FIG. 2 is a diagram schematically showing a constitution of a terminal device in a data sharing system according to an exemplary embodiment of the present invention.

FIG. 2 is a diagram schematically showing a constitution of a terminal device in a data sharing system according to an exemplary embodiment of the present invention.

The caller terminal device 100 may be configured to include a control unit 110, a communication unit 120, an input unit 130, an output unit 140, and a storage unit 150.

The control unit 110 performs overall control of the caller terminal device 100. In particular, according to the exemplary embodiment of the present invention, when content desired by a user is selected from content in use through a downloaded application, that is, an entire area or an area of content displayed on a screen is selected by the user, the control unit 110 reads content data of the selected area, controls the read content data to be transmitted to the service device 200, and controls content data obtained by analyzing and editing the content data to be received from the service device 200 and transmitted to a counterpart terminal device 100 through a messenger so that the received content data is shared with the counterpart terminal device 100. To this end, the control unit 110 may include a content selector 111 and a messenger processor 112.

The control unit 110 performs control so that the content, for example, text, images, videos, etc. of newspaper articles, the content of books, etc., is displayed on a screen of the output unit 140. As the user selects the desired entire or partial area from the content displayed on the screen, the content selector 111 of the control unit 110 reads only content data corresponding to the selected area. At this time, the content selector 111 enables the user to check or copy the area from the displayed content or to display the area in a different color.

In the reading of content data, only the content data displayed on the selected area may be read from a stored content file on the content displayed on the screen currently in use. In this case, the control unit 110 may divide the screen into predetermined areas, map pieces of content data displayed on the respective areas upon displaying the content on the screen to identification numbers of the areas, and separately store the pieces of content data with the identification numbers. Thus, when the user selects the corresponding area, the content selector 111 may check an identification number of the corresponding area and read content data mapped to the checked identification number. When the user selects the entire area, the content selector 111 may read all of the content data. Here, when the screen is a touch screen, the terminal device 100 may be set so that the user can select content according to the strength and direction of a direct touch on the screen. When the screen is not a touch screen, the terminal device 100 may be set so that content can be selected or copied using direction keys and specific keys of a keypad.

Meanwhile, when the content is displayed on the screen of the output unit 140, the control unit 110 may display on the screen a file access menu (icon, widget, etc.) enabling access to a content file itself, for example, a Java program, before the content file is converted into an image or a video displayed on the screen. In this case, when the user wants to select the displayed content as the content of interest, the user may simply select the file access menu displayed on the screen. When the file access menu is selected by the user, the content selector 111 may display that the content file of the corresponding content has been accessed on the screen of the output unit 140, and read content data from the storage unit 150. In this way and also various other ways, a content selection can be made.

The content selector 111 includes the read content data in content selection information and transmits the content selection information to the service device 200. Here, the content selection information may include at least one of the content data, display form information, and user input information.

In the read content data, the content selector 111 may mark specific information (specific word, paragraph, or sentence) with a special mark (in a different color, with a check mark, etc.). The specific information may be displayed using a word checked by the user or in a previously set form. The messenger processor 112 performs control so that edited content data is received from the service device 200 and transmitted to the counterpart terminal device 100 through the messenger in use.

Also, when information on the field of interest (a word or selection information on a list item displayed on the screen) is received from the user through the input unit 130, the messenger processor 112 controls the information on the field of interest to be transmitted to the service device 200 through the communication unit 120, receives content management data corresponding to the information on the field of interest from the service device 200 through the communication unit 120, and controls the received content management data to be transmitted to the counterpart terminal device 100 through the messenger so that the content management data can be shared with the counterpart terminal device 100. The communication unit 120 communicates with the service device 200 and the counterpart terminal device 100 via the communication network 10, thereby transmitting and receiving messages for a data sharing service. The communication unit 120 may transmit and receive data through various communication schemes as well as wired and wireless schemes. In addition, the communication unit 120 may transmit and receive data using one or more communication schemes. To this end, the communication unit 120 may include a plurality of communication modules which transmit and receive data according to different communication schemes.

The input unit 130 may generate a user input signal corresponding to a request or information of the user according to manipulation of the user, and may be implemented as various input means, which have been commercialized already or can be commercialized in the future. The various input means may include gesture input means which sense a motion of the user and generate a specific input signal as well as general input devices, for example, a keyboard, a mouse, a joystick, a touch screen, a touch pad, and so on. In particular, when content of a desired area is selected by the user from the content displayed on the screen of the output unit 140, the input unit 130 transmits an input signal for the selected content to the control unit 110.

The output unit 140 is a means for providing an operation result or an operational state of the terminal device 100 so that the user can recognize the operation result or the operational state. For example, the output unit 140 may include a display unit which visually outputs the corresponding data through a screen, a speaker which outputs an audible sound, or so on. In particular, in the present invention, the output unit 140 may display screens of the data sharing service, the messenger, and an application for the data sharing service run in the terminal device 100, display content to be provided to the user, and display a screen for causing content selection in the application screen.

The storage unit 150 stores the received content file, the content selection information, the content management data received from the service device 200, information on the data sharing service and the application for the data sharing service, and so on. Also, the storage unit 150 may map content data displayed on the screen to identification information on respective areas of the screen and store the content data with the identification information. The storage unit 150 includes magnetic media, such as a hard disk, a floppy disk, and a magnetic tape, optical media, such as a compact disk read only memory (CD-ROM) and a digital video disk (DVD), magneto-optical media, such as a floptical disk, a ROM, a random access memory (RAM), and a flash memory.

Next, a constitution of the service device 200 for providing a data sharing service according to an exemplary embodiment of the present invention is described as follows.

Figure 3:
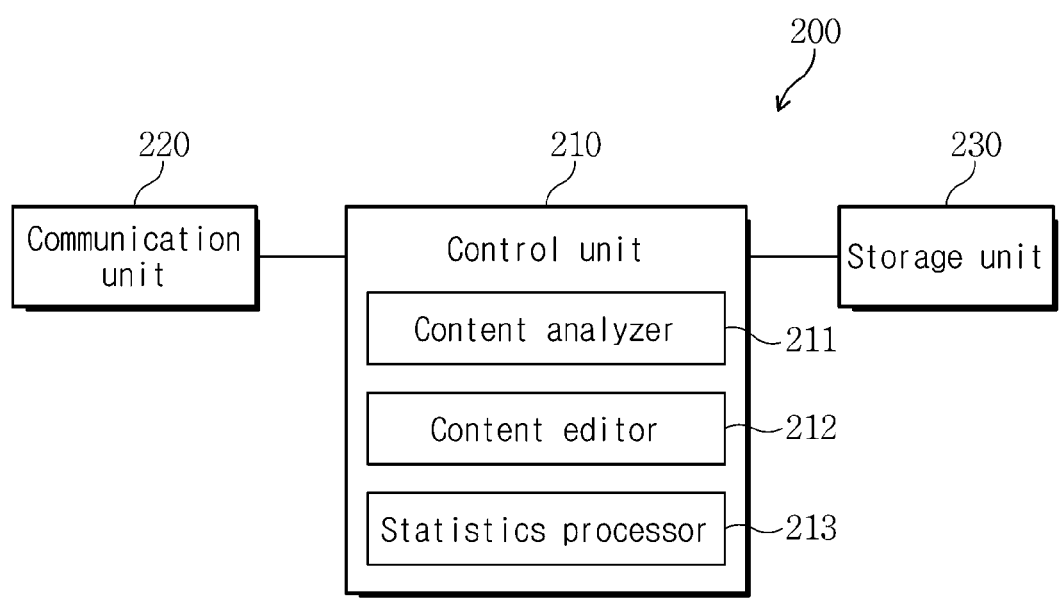
FIG. 3 is a diagram schematically showing a constitution of a service device in a data sharing system according to an exemplary embodiment of the present invention.

FIG. 3 is a diagram schematically showing a constitution of a service device in a data sharing system according to an exemplary embodiment of the present invention.

Referring to FIG. 3, the service device 200 may be configured to include a control unit 210, a communication unit 220, and a storage unit 230.

The control unit 210 controls overall operation of the service device 200, and may provide an application and content for a data sharing service to the terminal device 100.

Also, the control unit 210 may receive content selection information including selected content data from the terminal device 100, and analyze and edit (summarize) the content data selected by a user using the received content selection information. To this end, the control unit 210 may be configured to include a content analyzer 211, a content editor 212, and a statistics processor 213.

The content analyzer 211 analyzes the content data included in the content selection information received from the terminal device 100. For example, the content analyzer 211 searches the received content data for a special mark (a checked part, a color mark, a thick letter, a large letter, a headline (title), etc.) or specific information (a word, a paragraph, or a sentence) included in previously set items, filters content data corresponding to the found specific information (a paragraph or a sentence including the word or the sentence) from the received content data, and transfers the filtered content data (the paragraph or the sentence) to the content editor 212. Here, various methods can be applied to filtering of the paragraph or the sentence.

In the case of content provided from the service device 200, the content analyzer 211 may receive search information (a word or a sentence) desired by the user in provided entire content data as well as the data of an area of the content selected in the terminal device 100, that is, the selected content data, and filter the entire content data using the received search information (the word or the sentence).

Also, when not an area of the content but the content itself is checked in the terminal device 100, and content identification information on the content itself included in the content selection information is received, the content analyzer 211 checks whether the content is content provided from the service device 200, reads the entire content data for the provided content, and analyzes the entire content data according to an item previously set in the read entire content data. For example, the content analyzer 211 may decode the entire content data, and filter desired content data from the decoded data using at least one of the search information (the word or the sentence) desired by the user, a special mark (a headline (title), a large letter, a thick letter, a color mark, a checked part, etc.), and the previously set item. Here, in the case of content provided using the content identification information included in the content selection information, the control unit 210 of the service device 200 may read and analyze the content, or receive the content data from the terminal device 100 to analyze the received content data.

The content editor 212 edits the content data filtered in the content analyzer 211, and transmits the edited content data to the terminal device 100. For example, the content editor 212 may perform editing, such as summarizing, combining, etc. of the content data filtered in the content analyzer 211, or edit the filtered data according to the previously set item. Specifically, the content editor 212 may regard, for example, a word or a sentence displayed with large letters in the filtered content data as core content, separately configure a summary field, summarize the filtered content, and combine sentences including similar words. In this way and also various other ways, the editing of the content data can be performed.

The statistics processor 213 receives the edited content data from the content editor 212 from the content editor 212, performs statistical processing on the received content data according to fields of interest, dates, etc., and manages the received content data according to the fields of interest, dates, etc. Specifically, the statistics processor 213 checks information (a word, a sentence, etc.) included in the summary field from the edited content data, maps the checked information to previously set information (a word, a sentence, etc.) on a field of interest corresponding to the checked information, and stores and manages the edited content data in a database of the corresponding field of interest.

The communication unit 220 communicates with the terminal device 100 via the communication network 10, thereby transmitting and receiving messages for the data sharing service. The communication unit 220 may transmit and receive data using various communication schemes as well as wired and wireless schemes. In addition, the communication unit 220 may transmit and receive data using one or more communication schemes. To this end, the communication unit 220 may include a plurality of communication modules which transmit and receive data according to different communication schemes.

The storage unit 230 stores a program and data necessary for operation of the service device 200. Basically, an operating program of the service device 200 is stored. In addition, the storage unit 230 stores application data and content data to be provided, the content selection information received from the terminal device 100, items previously set for content analysis, edited content data, etc., classifies databases according to fields of interest, and stores statistical data in a database of the corresponding field of interest. The storage unit 230 includes magnetic media, such as a hard disk, a floppy disk, and a magnetic tape, optical media, such as a CD-ROM and a DVD, magneto-optical media, such as a floptical disk, a ROM, a RAM, and a flash memory. Although it has been described in this embodiment of the present invention that the storage unit 230 is included in the service device 200, a storage medium installed outside the service device 200 may be applied as the storage unit 230.

Meanwhile, a constitution of a terminal device according to another exemplary embodiment of the present invention is described as follows.

Figure 4:
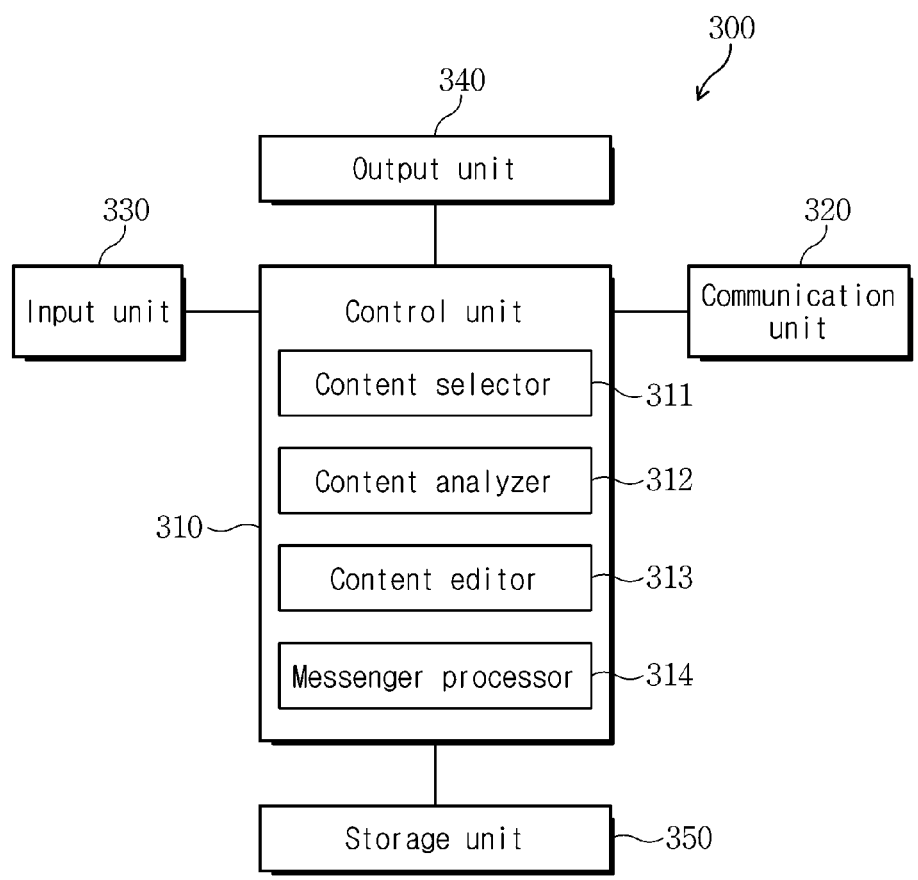
FIG. 4 is a diagram schematically showing a constitution of a terminal device according to another exemplary embodiment of the present invention.

FIG. 4 is a diagram schematically showing a constitution of a terminal device according to another exemplary embodiment of the present invention.

Referring to FIG. 4, a terminal device 300 may be configured to include a control unit 310, a communication unit 320, an input unit 330, an output unit 340, and a storage unit 350.

The control unit 310 performs overall control of the terminal device 300. In particular, according to the other exemplary embodiment of the present invention, the control unit 310 selects content desired by a user from content in use, analyzes and edits the selected content, and controls data resulting from the editing to be transmitted to a counterpart terminal device through a messenger so that the result data is shared with the counterpart terminal device. To this end, the control unit 310 may include a content selector 311, a content analyzer 312, a content editor 313, and a messenger processor 314.

The control unit 310 performs control so that the content, for example, a newspaper article, the content of a book, an image, a video, etc., is displayed on a screen of the output unit 340. When an entire area or an area desired by the user is selected from the displayed content, the content selector 311 of the control unit 310 reads only content data corresponding to the selected area from a stored content file on the displayed content. At this time, the content selector 311 enables the user to check or copy the area from the displayed content, or to display the area in a different color.

The content selector 311 transmits the content data for the selected area to the content analyzer 312. The content selector 311 operates in the same way as the content selector 111 according to the embodiment of the present invention, and thus detailed description of content reading will be omitted.

The content analyzer 312 analyzes and edits the content data read in the content selector 311. For example, the content analyzer 312 searches a special mark (a checked part, a color mark, a thick letter, a different font, a letter size, a headline (title), etc.) in the selected content data for a specific word, filters the found word or a paragraph or a sentence including the found word from the read content data, and transfers the filtered paragraph or sentence to the content editor 312. Also, the content analyzer 312 may check specific information input by the user or previously set items (e.g., a title, a purpose, an abstract, a summary, a gist, an effect, etc.) in the read content data, and search for a paragraph or a sentence including a checked word, thereby filtering the content data. In addition to this, various search and filtering methods can be applied.

In the case of content provided from the service device 200, the content analyzer 312 may search the provided entire content as well as the content data of the selected area for input search information (a word or a sentence) desired by the user or a previously set item.

Also, when not an area of the content but the content itself is checked, the content analyzer 312 may analyze and edit entire content data according to an item previously set in the entire content data. For example, the content analyzer 312 may decode the entire content data, and filter an area marked with a special mark (a headline (title), a large letter, a color mark, a different font, a headline (title) etc.) from the decoded data.

The content editor 313 edits the content data filtered in the content analyzer 211, stores and manages the edited content data, and transmits the edited content data to the messenger processor 314 so that the edited content data is transmitted through the messenger. For example, the content editor 313 may perform editing, such as summarizing, combining, etc. of words or sentences filtered in the content analyzer 312, or edit the filtered data according to the previously set item. The editing of content data in the content editor 313 is the same as a content data editing operation in the content editor 212 of the service device 200 according to the embodiment of the present invention, and thus detailed description thereof will be omitted.

The messenger processor 314 controls the content data edited in the content editor 313 to be transmitted to a counterpart terminal device 300 through the messenger so that the edited content data is shared with the counterpart terminal device 300.

The communication unit 320 communicates with the service device 200 and the counterpart terminal device 300 via the communication network 10, thereby transmitting and receiving messages for a data sharing service. The communication unit 320 may transmit and receive data using various communication schemes as well as wired and wireless schemes. In addition, the communication unit 320 may transmit and receive data using one or more communication schemes. To this end, the communication unit 320 may include a plurality of communication modules which transmit and receive data according to different communication schemes.

The input unit 330 may generate a user input signal corresponding to a request or information of the user according to manipulation of the user, and may be implemented as various input means, which have been commercialized already or can be commercialized in the future. The various input means may include gesture input means which sense a motion of the user and generate a specific input signal as well as general input devices, for example, a keyboard, a mouse, a joystick, a touch screen, a touch pad, and so on. In particular, when an entire area or an area is selected by the user from the content displayed on the screen of the output unit 340, the input unit 330 transmits an input signal for the content selection to the control unit 310. In the input signal transmitted by the input unit 330, an identification number of the selected area may be included.

The output unit 340 is a means for providing an operation result or an operational state of the terminal device 300 so that the user can recognize the operation result or the operational state. For example, the output unit 340 may include a display unit which visually outputs the corresponding data through the screen, a speaker which outputs an audible sound, or so on. In particular, in the present invention, the output unit 340 may display screens of the data sharing service, the messenger, and an application for the data sharing service run in the terminal device 300, and display a screen for causing content selection in the application screen.

The storage unit 350 stores a received content file, content selection information, edited content data, information on the data sharing service and an application for the data sharing service, and so on. Also, the storage unit 350 may perform statistical processing on the edited content data, and store and manage the edited content data in respective databases according to fields of interest. The storage unit 350 includes magnetic media, such as a hard disk, a floppy disk, and a magnetic tape, optical media, such as a CD-ROM and a DVD, magneto-optical media, such as a floptical disk, a ROM, a RAM, and a flash memory.

Meanwhile, no configuration for statistical processing in the terminal device 300 has been described according to the other embodiment of the present invention, but the control unit 310 may map the edited content data to previously set information on fields of interest, perform statistical processing on the edited content data according to the fields of interest, and store and manage the edited content data according to the fields of interest.

A method for providing a goods exchange service in a goods exchange service system constituted as described above will be described in detail with reference to accompanying drawings.

Figure 5:
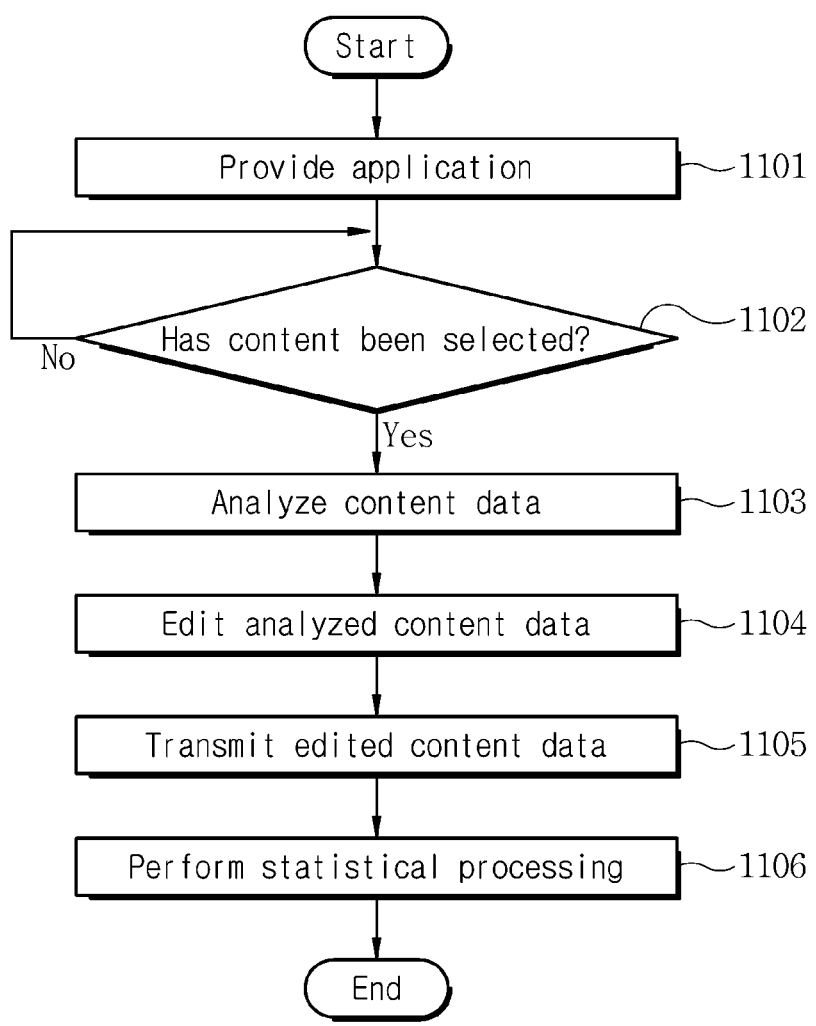
FIG. 5 is a diagram illustrating a method for a data sharing service in a service device of a data sharing service system according to an exemplary embodiment of the present invention.

FIG. 5 is a diagram illustrating a method for a data sharing service in a service device of a data sharing service system according to an exemplary embodiment of the present invention.

In step 1101, the service device 100 provides content and an application to the terminal device 100. Here, the terminal device 100 may be provided with content from the service device 100, or may be provided with content from another device and display the content. In the latter case, the service device 200 may be provided with information on currently running content from the terminal device 100 for the data sharing service.

Subsequently, in step 1102, the service device 200 checks whether an entire area or an area has been selected by a user from the content displayed in the terminal device 100, that is, whether content selection information including content data of a selected content area has been received. When it is checked that content selection information has been received, step 1103 is performed. Otherwise, the service device 200 waits for receiving content selection information.

In step 1103, the service device 200 checks the content selection information and analyzes selected content data included in the checked content selection information.

In step 1104, the service device 200 performs editing, such as summarizing, combining, etc. of the analyzed content data.

Subsequently, in step 1105, the service device 200 transmits content data obtained through the editing to the terminal device.

Then, in step 1106, the service device 200 performs statistical processing on the edited content data, and stores and manages statistical data obtained through the statistical processing.

Subsequently, when information on a field of interest input by the user is received from the terminal device 100, the service device 200 reads the corresponding content management data managed in a database of the field of interest corresponding to the information on the field of interest, and transmits the read content management data to the terminal device 100. At this time, for example, only content of a summary field may be read and provided in the form of a list as the transmitted content management data. Accordingly, the terminal device 100 may display the content list provided from the service device 200 on a screen, and may be provided with the corresponding content data from the service device 200 according to a selection input of the user and display the content data to the user.

The terminal device 100 checks the content data received from the service device 200, and transmits content data to the counterpart terminal device 100 through a messenger when the user wants to share the content data with a counterpart while using the messenger.

According to the above-described exemplary embodiment of the present invention, the terminal device 100 may share content, which is edited by summarizing and combining content desired by a user or specific information in displayed content data, with the counterpart terminal device 100 through a messenger, and may collect the content of articles (or books) in which the user is interested, compile statistics of the collected content, and manage the content. Accordingly, when a messenger is used, it is possible to easily notify a counterpart of the content of articles (books, images, or videos) even without writing out details of the content of interest.

Meanwhile, a method for a data sharing service in a terminal device in a multi-device environment according to another exemplary embodiment of the present invention will be described in detail with reference to a drawing.

Figure 6:
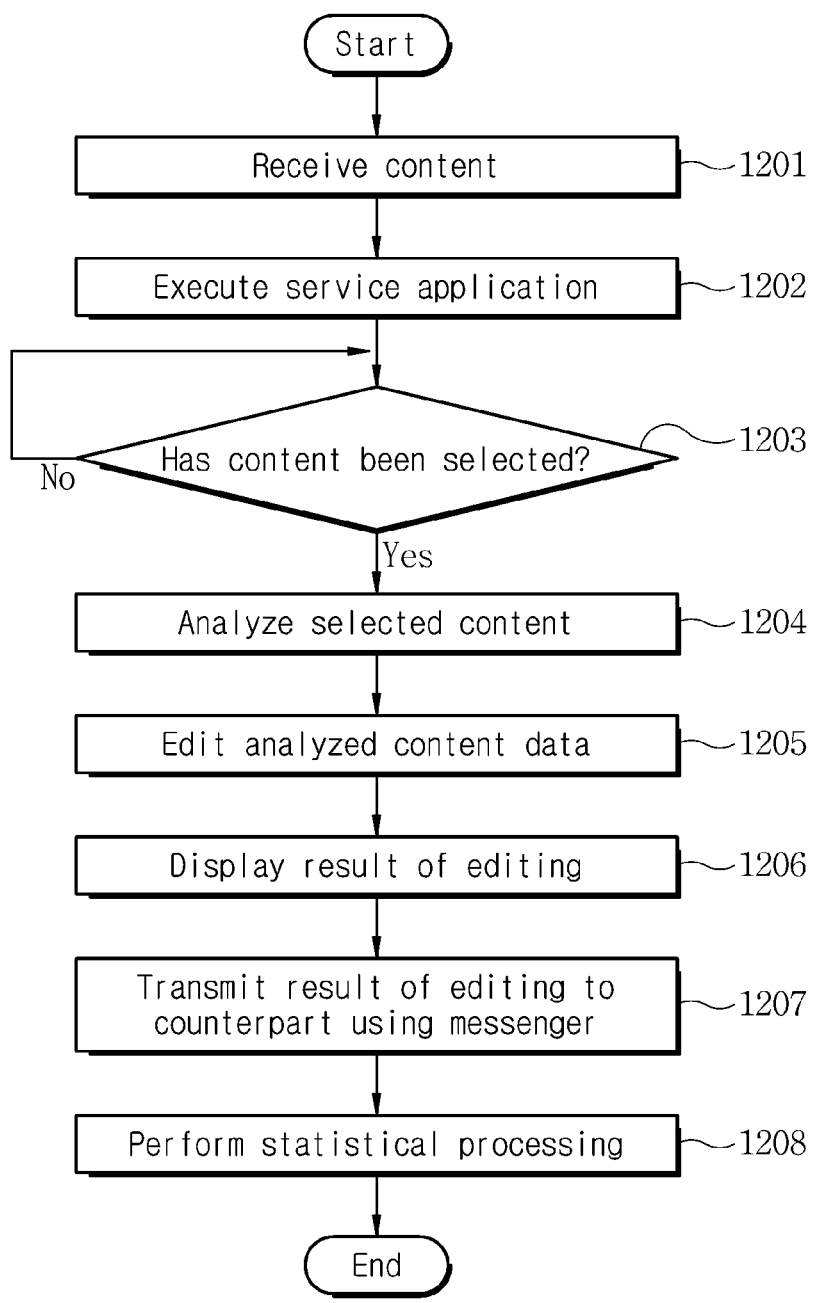
FIG. 6 is a diagram illustrating a method for a data sharing service in a terminal device of a data sharing system according to other exemplary embodiments of the present invention.

FIG. 6 is a diagram illustrating a method for a data sharing service in a terminal device according to the other exemplary embodiments of the present invention.

Referring to FIG. 6, in step 1201, the terminal device 300 is provided with content and displays the content.

In step 1202, the terminal device 300 executes a service application for a data sharing service.

In step 1203, the terminal device 300 checks whether an entire area or an area has been selected by a user from content displayed on a screen through the service application. When it is checked that a user has selected a desired area, step 1204 is performed. Otherwise, the terminal device 300 keeps waiting for content selection of a user.

The terminal device 300 analyzes content data of the selected area in step 1204, and edits the analyzed content data by summarizing and combining the analyzed content data in step 1205.

Subsequently, the terminal device 300 displays the analyzed content data in step 1206.

In step 1207, the terminal device 300 transmits the edited content data to the counterpart terminal device 100 using a messenger.

In step 1208, the terminal device 300 performs statistical processing on the edited content data and stores the edited content data.

According to the above-described other embodiment of the present invention, the terminal device 300 transmits content data which is obtained by analyzing and editing selected content data to the counterpart terminal device 300 through a messenger when the user wants to share the content data with a counterpart while using the messenger. In this way, the terminal device 300 may share content data, which is edited by summarizing and combining content desired by the user or specific information in displayed content data, with the counterpart terminal device 300 through the messenger, and may collect the content of articles (or books) in which the user is interested, compile statistics of the collected content, and manage the content. Accordingly, when a messenger is used, it is possible to easily notify a counterpart of the content of articles (or books) even without writing out details of the content of interest.

A method for a data sharing service according to the present invention may be implemented recorded in the form of software readable by various computing means and recorded in a computer-readable recording medium. The recording medium may separately include program commands, data files, data structures, etc., or include a combination of them. The program commands recorded in the recording medium may be specially designed and configured for the present invention, or known and available to those of ordinary skill in the field of computer software. Examples of the recording medium include magnetic media, such as a hard disk, a floppy disk, and a magnetic tape, optical media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers. Such a hardware device may be configured to operate as one or more software modules for performing operation of the present invention, and vice versa.

What is claimed is:

1. A terminal device for a data sharing service using an instant messenger, comprising:
    a communicator configured to:
        communicate with a counterpart terminal device via a communication network; and
        transmit, to the counterpart terminal device, content data edited by a content editor via the instant messenger;
    a display configured to display content in use on a screen;
        an input signal generator configured to, when an entire area or a partial area of the displayed content is selected, generate an input signal for the selected area;
    a memory configured to store the content data; and a controller comprising:
        a content selector configured to:
            divide the screen of the display into a plurality of areas;
            assign an identification number from a plurality of identification numbers to each of the plurality of areas of the screen, each of the plurality of identification numbers associated with a corresponding one of the plurality of areas of the screen;
            receiving a selection of an area from the plurality of areas of the divided screen, the selected area including either the partial area or the entire area of the displayed content;
            extract, from the stored content data, content data corresponding to the selected area of the screen based on the identification number assigned to the selected area; and
            transmit, to a content analyzer, the extracted content data;
        the content analyzer configured to:
            determine that the extracted content data comprises a visual marking in the selected area including at least one of a highlighted portion of the extracted content data, a color mark in the extracted content data, a conspicuous letter in the extracted content data, or a conspicuous typeface in the extracted content data, the visual marking provided by a user of the terminal device;
            determine that a predetermined word or a predetermined phrase is included in the extracted content data;
            acquire, from the extracted content data, content data having the visual marking and the predetermined word or the predetermined phrase; and
            transmit, to the content editor, the acquired content data; and
        the content editor configured to:
            create a summary field from the acquired content data based on the visual marking;
            combine an additional word or additional phrase with the acquired content data, wherein the additional word or the additional phrase comprises a similar word or a similar phrase with the acquired content data; and
            categorize the edited content data into fields of interest.

2. The terminal device of claim 1, wherein the controller is configured to:
    organize a file access menu for accessing a stored content file in the screen, and
    access the content file to read the content data in response to a user's selection of a file access menu.

* * * * *